US009390161B2

(12) United States Patent (10) Patent No.: US 9,390,161 B2
Shehata et al. (45) Date of Patent: Jul. 12, 2016

(54) METHODS AND SYSTEMS FOR EXTRACTING KEYPHRASES FROM NATURAL TEXT FOR SEARCH ENGINE INDEXING

(76) Inventors: Shady Shehata, Waterloo (CA); Fakhri Karray, Waterloo (CA); Mohamed Salem Kamel, Waterloo (CA)

( * ) Notice: Subject to any disclaimer, the term of this patent is extended or adjusted under 35 U.S.C. 154(b) by 326 days.

(21) Appl. No.: 13/497,982

(22) PCT Filed: Sep. 24, 2010

(86) PCT No.: PCT/CA2010/001495
§ 371 (c)(1),
(2), (4) Date: Jun. 6, 2012

(87) PCT Pub. No.: WO2011/035425
PCT Pub. Date: Mar. 31, 2011

(65) Prior Publication Data
US 2012/0246100 A1 Sep. 27, 2012

Related U.S. Application Data

(60) Provisional application No. 61/245,834, filed on Sep. 25, 2009.

(51) Int. Cl.
*G06F 15/18* (2006.01)
*G06F 17/30* (2006.01)
*G06F 17/27* (2006.01)
*G06N 7/00* (2006.01)
(Continued)

(52) U.S. Cl.
CPC ...... *G06F 17/30616* (2013.01); *G06F 17/2775* (2013.01); *G06F 17/30719* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| 5,146,405 | A | * | 9/1992 | Church | G06F 17/271 |
| | | | | | 700/90 |
| 5,794,177 | A | * | 8/1998 | Carus | G06F 17/274 |
| | | | | | 704/10 |
| 5,960,383 | A | * | 9/1999 | Fleischer | G06F 17/277 |
| | | | | | 704/9 |

(Continued)

OTHER PUBLICATIONS

A Concept-based Model for Enhancing Text Categorization Shady Shehata, Fakhri Karray, and Mohamed Kamel.*

(Continued)

*Primary Examiner* — Kakali Chaki
*Assistant Examiner* — Ababacar Seck
(74) *Attorney, Agent, or Firm* — Norton Rose Fulbright Canada LLP (57) ABSTRACT

The present invention is a method and system for the extraction of keyphrases from natural text. For the purpose of this document, keyphrases are text segments that represent the main topic of a text. The method of the present invention may facilitate keyphrase extraction from any length of text. The text may be of several varieties, such as, for example a sentence, paragraph, document or collection of documents. Phrase separator methods may be applied to the text to extract phrases from the text. From these phrases the present invention may identify the one or more phrases that are integral to the meaning of the text and these may be identified as the keyphrases of the text. The text may be indexed using the keyphrases so that a search based upon any of the keyphrases will cause search engines and/or text retrieval means to retrieve the text.

23 Claims, 7 Drawing Sheets

(51) Int. Cl.
*G06N 99/00* (2010.01)
*G06N 5/02* (2006.01)

(56) References Cited

U.S. PATENT DOCUMENTS

| | | | | |
|---|---|---|---|---|
| 6,601,026 B2* | 7/2003 | Appelt | ............. | G06F 17/30616 704/9 |
| 7,302,426 B2* | 11/2007 | Bier | .................. | G06F 17/30973 |
| 7,451,395 B2* | 11/2008 | Brants | ................. | G06F 17/2229 715/254 |
| 8,327,265 B1* | 12/2012 | Vogel | ................... | G06F 17/271 704/4 |
| 8,515,972 B1* | 8/2013 | Srikrishna | ......... | G06F 17/30864 707/750 |
| 2007/0061320 A1* | 3/2007 | Surendran | ......... | G06F 17/30719 |
| 2007/0067157 A1 | 3/2007 | Kaku et al. | | |
| 2007/0078889 A1* | 4/2007 | Hoskinson | ........ | G06F 17/30705 |
| 2007/0112764 A1* | 5/2007 | Yih | ....................... | G06F 17/241 |
| 2007/0239716 A1 | 10/2007 | Weininger et al. | | |
| 2009/0228468 A1 | 9/2009 | Qin et al. | | |

OTHER PUBLICATIONS

A Concept-based Model for Enhancing Text Categorization—2007 Shady Shehata, Fakhri Karray, and Mohamed Kamel.*

* cited by examiner

METHODS AND SYSTEMS FOR EXTRACTING KEYPHRASES FROM NATURAL TEXT FOR SEARCH ENGINE INDEXING

RELATED APPLICATION

This application claims the benefit of U.S. Provisional Patent Application No. 61/245,834 filed on Sep. 25, 2009, the entirety of which is incorporated by reference herein.

FIELD OF THE INVENTION

This invention relates in general to the field of methods and systems for extracting keyphrases from natural text and more particularly to using such keyphrases for search engine indexing.

BACKGROUND OF THE INVENTION

Users of the Internet have a desire to search for websites in a manner that permits them to obtain desired results easily and efficiently. Presently users must carefully formulate their queries in order to obtain the information they are seeking. This is difficult for some users, particularly novice users, as they may lack the skills, expertise, knowledge, experience or patience to formulate a query capable of yielding the desired information.

To aid users several website authors have undertaken to formulate queries that provide results that may be of interest to particular users that visit those websites. These queries provide results tailored to the content the user is assumed by the website author to be interested in, based on the fact that they are searching from a particular website. The effect of this is that the query formulated by a user from a particular website may be interpreted in a manner that is influenced by the website content. Consequently queries from particular websites may produce nuanced results.

It may not be convenient for users to visit a particular website in order to generate a specialized or nuanced search. Instead users may wish to perform searches from general-purpose search sites, such as www.google.com. Prior art, such as US Patent Application No. 2007/0239716 recognizes this wish and provides a user with an ability to specify which types of specialized searches they are interested in, so that specialized search results may be tailored to affirmed areas of interest. This is achieved by way of allowing third party content providers to create enhancements to a search result page triggered on queries matching certain patterns.

Other prior art, such as US Patent Application No. 2007/0112764, discloses a means of utilizing phases or keywords to analyze web documents. Such prior art is intended to address issues relating to correct associations, ranking, and relevancy of the keywords and phrases to web documents. These issues can be important in returning search results to a user.

In general prior art methods tend to analyze phrases by counting the frequency of a phrase within a document. Two or more phrases may have the same frequency in a document. However, it is possible that one phrase may offer a superior contribution to the meaning of the text than other phrases occurring within the text at the same frequency. Consequently, merely counting the frequency of keyphrases within text will not identify the keyphrase that is integral to the meaning of the text.

SUMMARY OF THE INVENTION

The present invention provides a computer implemented method for extracting keyphrases from natural text, the method comprising: (a) generating one or more phrases in the natural text based on an identification of one or more phrase separators in the natural text; (b) assigning a weight to each phrase based on its frequency in the natural text; and (c) ranking the phrases based on their weights to extract one or more keyphrases having the highest ranks.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a method and system for the extraction of keyphrases from natural text. "Natural Text" refers to any kind of text data, whether unstructured (i.e. text in "raw" format) or text in the form of emails, documents, blogs. It should be understood that the present invention may include an extraction step wherein text is extracted from an application to implement the method of the present invention.

For the purpose of this document, keyphrases are text segments that represent the main topic of a text. The method of the present invention may facilitate keyphrase extraction from any length of text. The text may be of several varieties, such as, for example a sentence, paragraph, document or collection of documents. Phrase separator methods may be applied to the text to extract phrases from the text (examples provided below). From these phrases the present invention may identify the one or more phrases that are integral to the meaning of the text and/or represent the main topic of the text. Such identified phrases may be identified as the keyphrases of the text. The text may be indexed using the keyphrases so that a search based upon any of the keyphrases will cause search engines and/or text retrieval means to retrieve the text. A summary of the text may be generated based upon the key word.

Figure 1A:
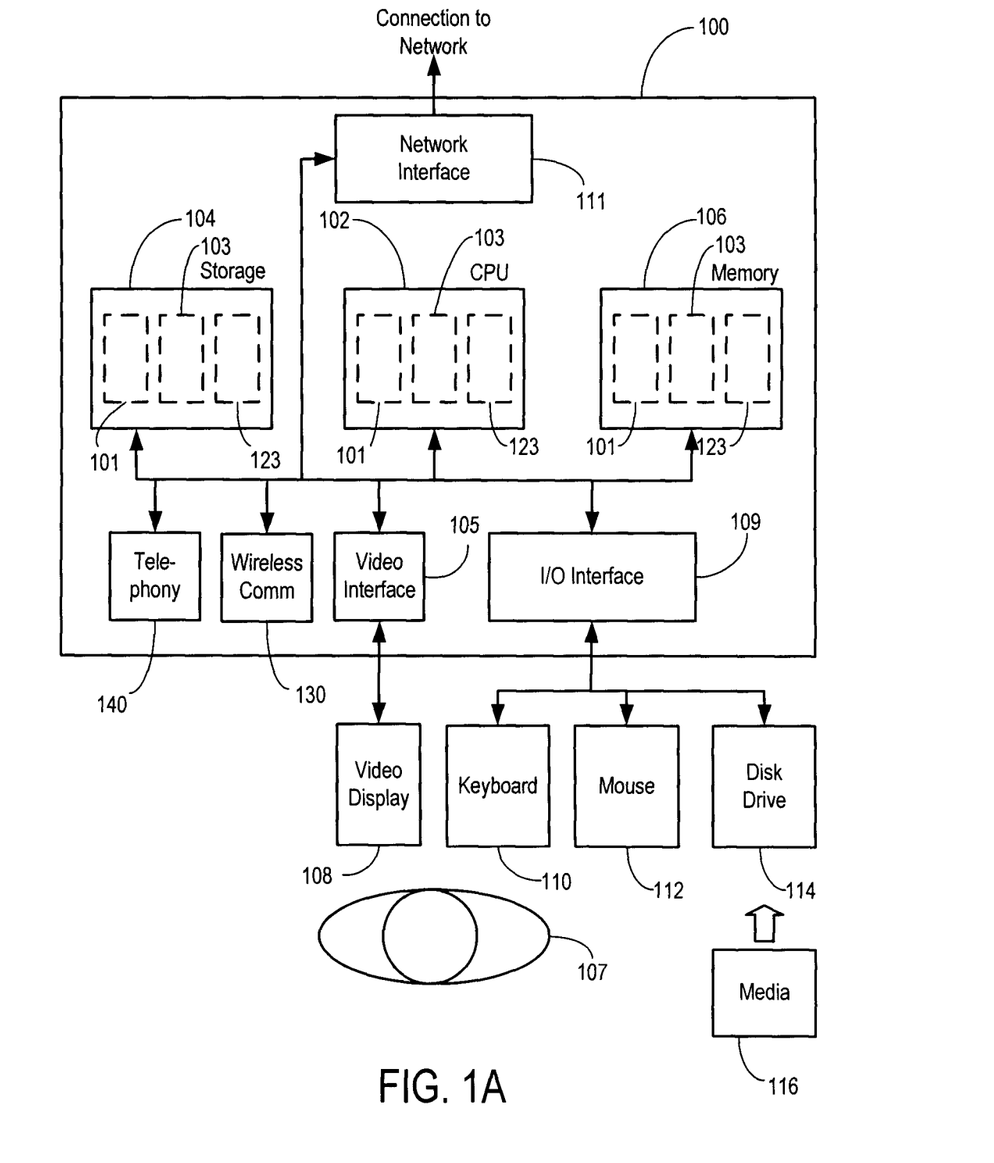
FIG. 1A is a generic computer device that may provide a suitable operating environment for the invention.

The present invention may be practiced in various embodiments. A suitably configured computer device, and associated communications networks, devices, software and firmware may provide a platform for enabling one or more embodiments as described below. By way of example, FIG. 1A shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). The particular configurations shown by way of example in this specification are not meant to be limiting. For example, the computer device 100 may be configured into a mobile computer device by adding a wireless communications module 130 operatively connected to the above described modules, and adapted for wireless communication, for example via Wi-Fi, Wi-Max, a 3G cellular network or some other suitable wireless communications standard, to connect to the Internet or other private or public communications network. The computer device 100 may also be further configured with a telephony module 140 operatively connected to the above described modules, and adapted to provide voice communications. Thus, in alternative embodiments, the computer device may be configured into a handheld form factor such as a personal digital assistant (PDA) or a wireless mobile smart phone.

In one embodiment of the method of the present invention, it comprises: (1) identifying phrases in a text, by using phrase separators that may be implemented by intelligent classifiers; (2) determining a weight for each phrase based on the frequency of each phrase in the text; (3) identifying one or more of the phrases that may be important to the meaning of the text, which may be referred to as "keyphrases"; (4) defining a weight of each sentence based on the weights of the keyphrases in those sentences; (5) providing a summary based on one or more sentences having the highest weight.

The weighting of phrases may be calculated for each of one or more texts based on the frequency of the phrase within each text and between overlapping words. For example, where "a", "b", "c" and "d" are words and "e" is a phrase separator, then the sentence "a b c e a b c d" may result in the phrase "a b c" having a weight of 2 (since it occurs both in "a b c" and "a b c d"), for example, while "a b c d" has a weight of 1, for example. Furthermore, the weighting may include both the frequency of the phrases in each text and the weighting of individual words of the phrase as in the prior art.

The keyphrases may be one or more of the highest ranked phrases. The number of highest ranked phrases to be assigned as keyphrases can be provided as a configurable number based on a threshold weight or on a particular number of desired keyphrases. Each text may be provided with a weight based on the weight of the keyphrases in those texts. One or more of the texts having the highest weight may be provided as a summary. The summary may be limited to a particular number of texts or to all texts above or below a particular weight.

The present invention may apply a variety of methods to identify phrase separators within a text. Utilizing the phrase separators it may be possible to generate one or more phrases from the text, based upon heuristic rules. The frequency of the one or more phrases within the text may be calculated. A probability value may be assigned each phrase to measure its importance based on factors including the phrase frequency and prior knowledge. For example, a knowledge-based system may be provided that comprises a list of common phrases. These common phrases may be associated with their probability values and used as an external measure to compute the importance of the generated keyphrases.

The phrases may be ranked based on their weights as keyphrases, in accordance with the probability values assigned to each phrase. One or more phrases having the highest ranking may be identified as keyphrases. The identified keyphrases extracted from the text may represent the main topic of the text. The identified keyphrases may be utilized for text summarization by ranking pieces of text that include the keyphrases. These pieces of text may be assembled as a summary. The keyphrases may also be utilized to index the text. Indexing may enable the text to be retrieved by search engines or text retrieval means when one or more of the keyphrases or components thereof are entered as a base for the search.

The present invention provides a benefit over prior art in that it allows for the identification of keyphrases that are integral to the meaning of the text. Prior art methods of keyphrase extraction analyzed phrases by counting the frequency of a phrase within a document. The outcome may be that two or more phrases have the same frequency. Yet, it is possible that one phrase may offer a superior contribution to the meaning of the text than other phrases occurring within the text at the same frequency. Merely counting the frequency of keyphrases within text will not differentiate between keyphrases that are integral to the meaning of the text and phrases that appear in the text frequently. The present invention may identify keyphrases in a text and can distinguish between those that appear frequently and the keyphrases that are meaningful to the text.

The present invention offers another benefit over the prior art in that it may facilitate a more effective means for a user to search text relevant to a specific topic. In order to establish the relevancy of text located by search engines in accordance with prior art a user may need to read the text. The present invention may permit a user to locate text that is important to him or her and may not require that the user read the entire text to verify its importance. This can save the user significant reading and analysis time. This outcome may be possible because the present invention may generate an efficient summary based upon the keyphrases extracted from the text, and this summary may represent to a user what the topic and meaning of the text.

An additional benefit of the present invention over the prior art may be that it provides a more selective list of possible keyphrase matches for a user. Prior art methods and systems may identify a large number of relevant documents based upon a keyphrase search. This is due to the fact that the prior art does not establish the relevance of keyphrases to the text. The present invention does not necessarily attach a keyphrase to a text merely based upon the fact that the phrase appears frequently in the text. If the phrase does not have meaning to the topic of the text the phrase will not be identified as a keyphrase for the text. As a result, the present invention may provide more streamlined, focused and/or narrower search results. A user may have fewer texts to review from the search results, and the majority of the texts may be relevant to the needs of the user because each the one or more keyphrases the user based the search upon are relevant to the topic of the text. This can save the user significant time in reviewing texts.

Phrase separators may identify specific words that are used to split the text into phrases. The splitting splits the meaning of the sentence into different parts. Identification of the phrase separators may be performed using heuristic rules based on part of speech taggers, for example by identifying verbs as phrase separators.

A phrase generator may generate possible phrases from text. The most common phrase generators are used for documents or collections of documents. The phrase generator may generate meaningful phrases within a sentence that have overlapped words, for example where a particular phrases is a subset of another phrase. This overlapping is used to obtain the frequencies of these generated phrases to obtain the importance of the phrase within a sentence.

Phrases generated may be subject, verb, and object. In addition, phrase separators can be identified by intelligent classifiers that are trained on annotated examples. Intelligent classifiers may implement or may be embodied by common classification algorithms such as Support Vector Machine (SVM), k Nearest Neighbor (kNN), etc. These classification techniques may be trained on sentences that have predetermined phrase separators to generate a model. This model is used to identify phrase separators in new sentences.

A variety of phrase separator methods may be applied by the present invention. The one or more phrase separator methods applied may depend upon the type of text that the one or more keyphrases are to be extracted from. In one embodiment of the present invention an intelligent classifier may be utilized to extract specific words from one or more sentences within a text. Each specific word may be a phrase separator.

In another embodiment of the present invention, a speech tagging and knowledge-based English language dictionary method may be applied to identify phrase separators within text. Yet another embodiment of the present invention may facilitate a division of a text into phrases based upon phrase separators.

In one embodiment of the present invention, two or more methods of phrase separator identification may be applied. One or more of these phrase separator methods may apply efficient heuristic rules to extract one or more phrases from the text. The phrase separator methods may be utilized collaboratively to generate all possible phrases from a sentence. The number of phrases generated may be dependent on the amount of information in the text.

Figure 1B:
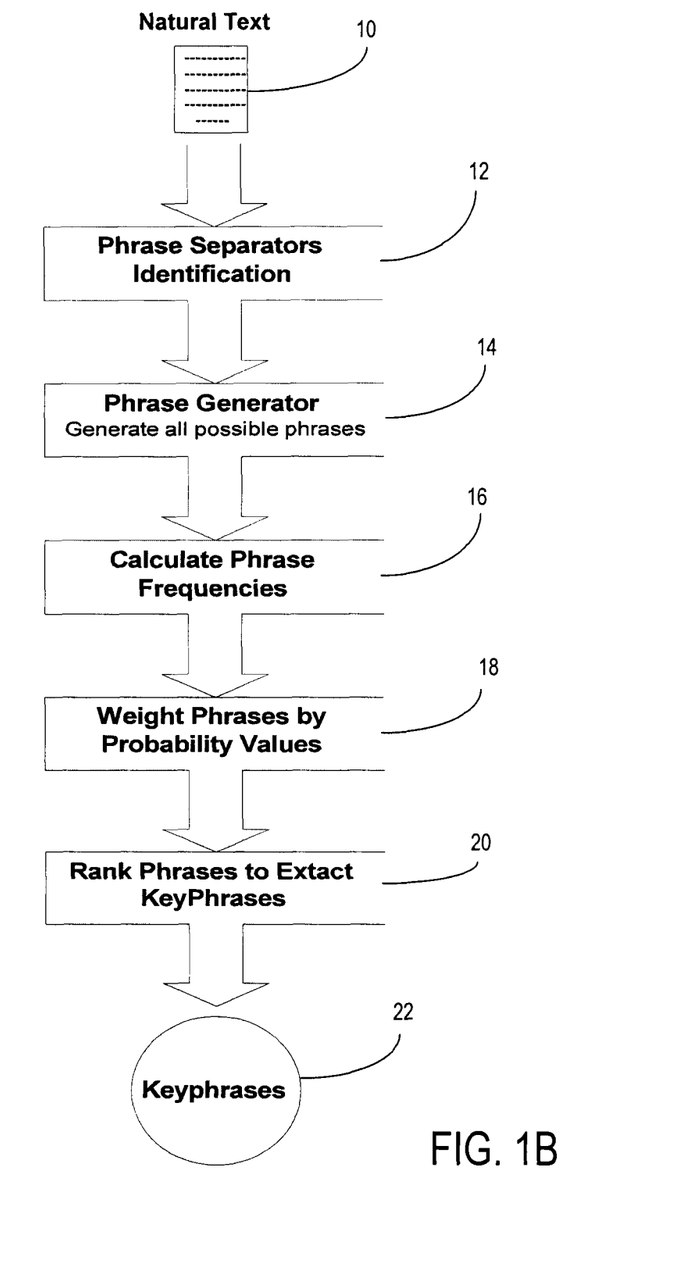
FIG. 1B is a flow-chart of a method of the present invention.

As shown in FIG. 1B, in one embodiment of the present invention, natural text 10 may be utilized for phrase separator identification 12. A phrase generator 14 may be applied that utilizes the phrase separators and applies these to the text to generate all possible phrases. The one or more phrases extracted from the text may be reviewed and analyzed to capture the importance of each phrase as it relates to the text. The frequency of each phrase within the text and within each of the phrases may be calculated 16. Each phrase may be weighted. Weighting of phrases may involve assigning a probability value to each phrase 18. The probability value awarded may be based on the frequency of the phrase within the text and within each of the phrases. Each phrase may be ranked in relation to other phrases 20 in accordance with the weight assigned to each phrase. The highest ranking phrases may be identified as keyphrases 22.

In one embodiment of the present invention text may be summarized in accordance with one or more keyphrases. The summarization method may involve identifying one or more pieces of text that contain keyphrases. Such pieces of text may be text segments of varying lengths. The identified text segments may be ranked in relation to each other. The rank of the text segments is computed based on the score of its keyphrases. For each text segment, the keyphrases that have the highest scores are identified into their text segments. The text segments that have the highest scores are selected for the purposes of defining the text summary in accordance with the present invention. The text segments that are granted a high ranking may be selected and included in a summary of the text. The summary of the text may be saved by the system, such as, for example in a database, and may be retrieved from where it is stored, and/or reviewed or searched where it is stored. The summary of the text may be utilized for a variety of purposes, such as, for example display to a user. The user may read or scan the summary to derive an understanding of the content of the text as a whole as it relates to one or more keyphrases. As the keyphrases reflect not only the phrases utilized in the text, but phrases that are relevant to the topic of the text, the summary being based upon keyphrases can allow a user to evaluate whether a particular text is relevant for his or her purposes without requiring access to the whole of the text. In one embodiment of the present invention, the summary may be presented so as to allow a user to gain an understanding of the relevancy of the text for particular purposes at a glance.

In one embodiment of the present invention the keyphrases may be indexed and stored in relation to a text, such as, for example in a database. A user may perform a search, by operation of one or more search engines or other text retrieval means, and may utilize one or more keyphrases as a search term, or within a search term entered as a string. The search term entered by the user may be utilized by the search engines and/or text retrieval means, to search for a match with the keyphrases. A match between a search term and a keyphrase may cause the one or more texts relevant to said keyphrase to be retrieved for the user.

Figure 2:
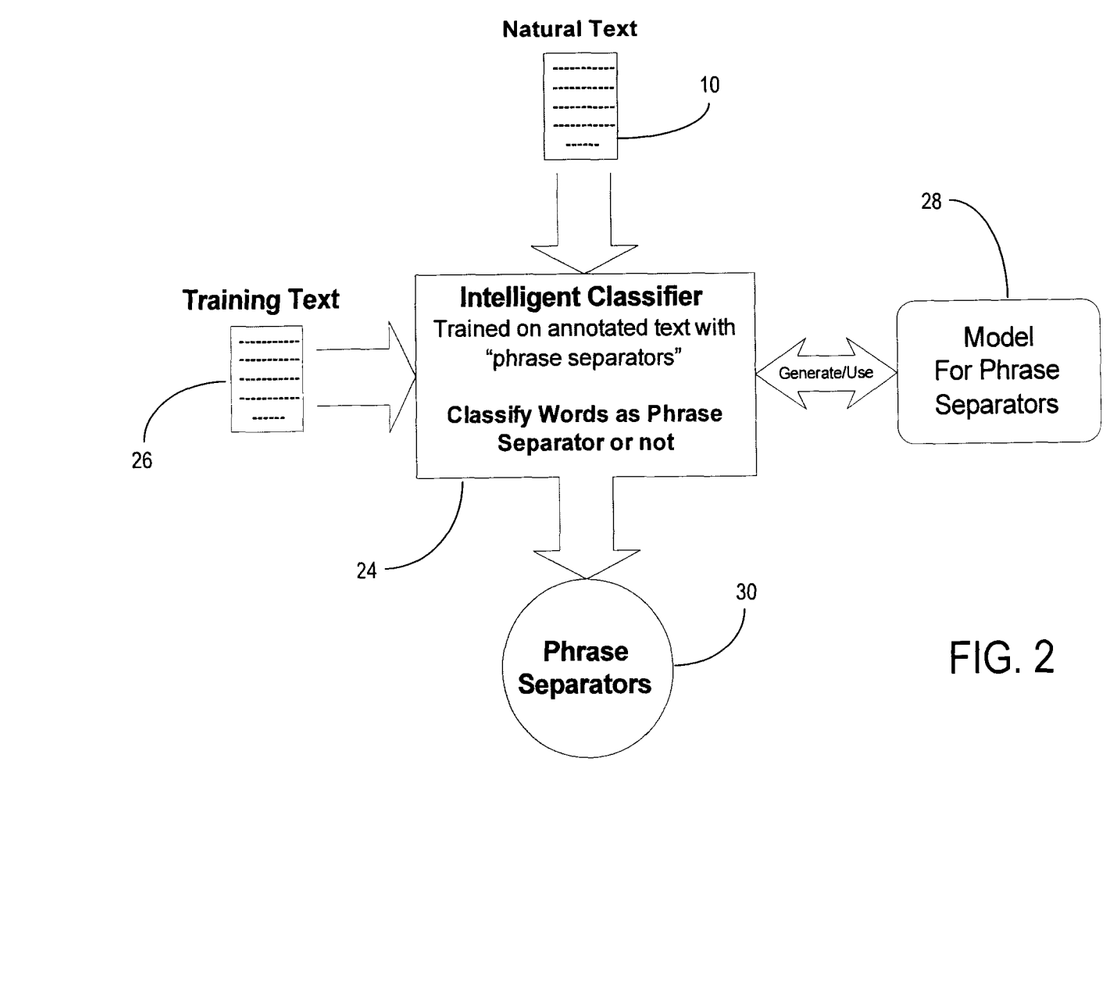
FIG. 2 is a systems diagram of the intelligent classifier for identifying phrase separators in natural text.

As shown in FIG. 2, an intelligent classifier 24 may be utilized to generate phrase separators. The intelligent classifier may be trained on one or more training texts 26. For example, multiple training texts to generate phrase separators may be used to train the intelligent classifier, such as approximately one million training texts. The one or more training texts may teach the intelligent classifier to generate specific phrase separators. One or more training texts may be prepared having phrase separators already identified in the text. The intelligent classifier may be trained to identify the phrase separators identified in the one or more training texts. Whereby, the intelligent classifier may learn to recognize phrase separators in texts based upon the types of phrase separators identified in the one or more training texts. For example, types of phrase separators identified in training texts and taught to the intelligent classifier may include word position, part of speech tagging, word type, and other features or parts of text. During a testing stage the intelligent classifier may facilitate the classification of particular words or phrases within a practice text as either a phrase separator or not a phrase separator. The intelligent classifier may be applied to a text to identify phrase separators by identifying portions of the text as phrase separators or not phrase separators. The output of the intelligent classifier may be one or more phrase separators 30.

Figure 3:
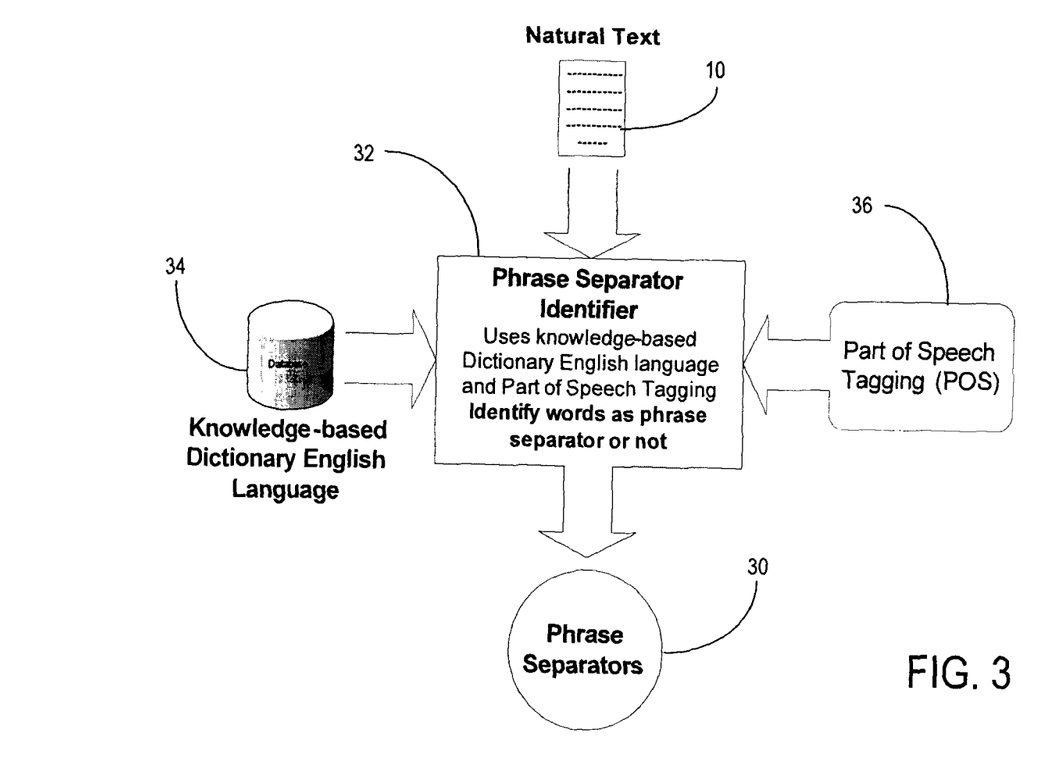
FIG. 3 is a systems diagram showing the identification of phrase separators in natural text using knowledge-based dictionary English language and part of speech tagging.

Models for phrase separators 28 may be utilized or generated by the intelligent classifier. For example, a Part of Speech (POS) tagging model, as shown in FIG. 3, may be one such model. A POS model may utilize a knowledge-based dictionary for English language 34 to identify phrase separators 32 based on the part of speech tags 36 allotted within the text. The POS model may identify phrase separators based on part of speech tagging and knowledge-based dictionary by assigning a part of speech tag to each word in the text. A knowledge-based dictionary of English language may be utilized to build a hash table for each English word in the text 10. Each word may be associated with possible part of speech tags. Each word may be evaluated in accordance with a lookup table as to whether the word has one or more part of speech tags. By way of this evaluation each word may be identified as either a phrase separator or not a phrase separator. The output of the intelligent classifier may be one or more phrase separators 30.

Figure 4:
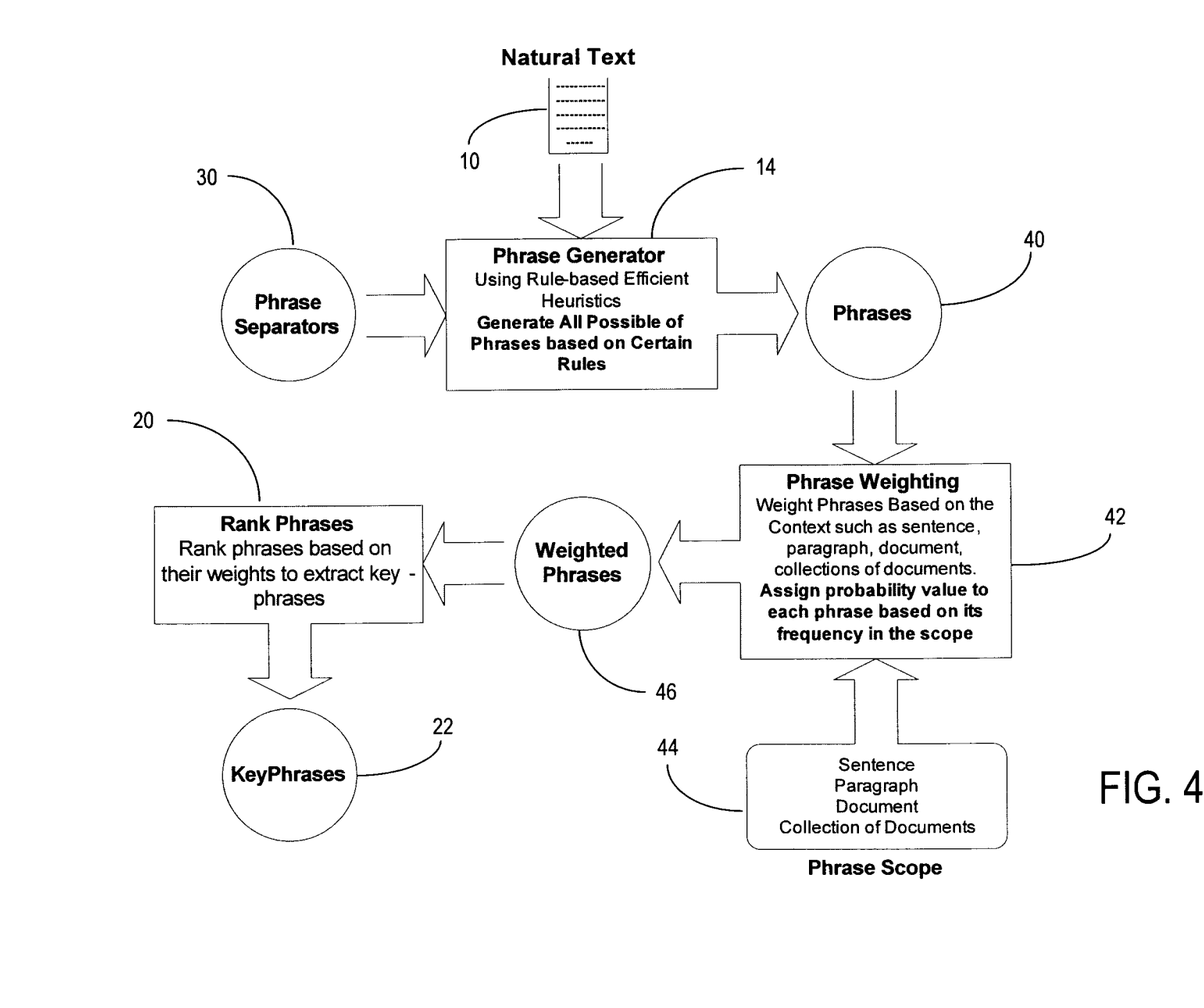
FIG. 4 is a systems diagram showing the statistical-based keyphrases generator.

Once phrase separators are identified, as shown in FIG. 4, a phrase generator 14 may be utilized to generate phrases from a text 10. The phrase generator may extract phrases in the text. It may identify phrases based on the scope of the phrase. For example, within one text phrases may be identified and extracted from various portions of the text, such as, for example a sentence, paragraph, document or collection of documents. The phrase generator may apply one or more phrase separators 30. The phrase separators may be applied to split the text based on efficient heuristic rules. The output of the phrase generator may be one or more phrases 40. In one embodiment of the present invention the output may be all possible phrases in the text as identified based upon the phrase separators.

The frequency of each phrase as it occurs within all possible generated phrases and/or the text may be calculated. The calculation may be based on the scope of the phrase 44. The scope of the phrase may include any portion of a text, such as, for example sentences, paragraphs, a document, or a collection of documents. The calculation may determine the frequency of a phrase within other phrases, and/or other portions of the text. The calculation may incorporate all possible generated phrases identified by the phrase generator, or a subset of phrases. In one embodiment of the present invention, the process of calculating the frequencies of phrases may be based on words that appear in each phrase. Consider phrase p1="w1 w2 w3" and p2="w1 w2", where p1, p2 are phrases and w1, w2, w3 are individual words. After removing stop words, if p2 is a subset of p1 then the frequency of p2 is increased by one. As the invention is not specific to a certain language, stop words depends on each language. Stop words are used for the English language as an example.

In one embodiment of the present invention the frequency of a phrase p with a scope may be calculated by:

$$weight_{p_{scope}} = freq(p, scope), \text{ where } scope=\{sent, parag, doc, collec\}$$

The average frequency of phrase p that appeared in text may be calculated by:

$$weight_p = \frac{\sum_{i=1}^{s} weight_{p_{sent}}}{s},$$

where s is the total number of sentences that contain phrase p in document d.

Phrases may be weighted 42. This may occur based on context of the phrase to the text. A probability value may be assigned to each phrase. The probability value may be based on the frequency of the phrase in the text. In one embodiment of the present invention, prior probabilities of phrases within one or more phrase scopes may be calculated and used to assign a new probability value to each generated phrase. The new probability value may be based on phrase frequency. The probability value may be used to generate a score for each phrase. This score may indicate relevance of a phrase to the topic of the text. The scored phrases may be weighted phrases 46.

Weighted phrases may be ranked in accordance with their weights to extract keyphrases from the phrases. The ranking of phrases 20 may be based upon the relevancy of the phrase to the topic of the text. A phrase that is relevant to the topic of the text may be deemed important. The probability value assigned to each phrase may identify the phrase as either an important phrase or as a non-important phrase. Identification as an important phrase or a non-important phrase may be facilitated in accordance with the frequency of occurrence of the phrase in the entirety of all of the generated phrases, or a subset of phrases, and based probabilities. Phrases identified as important and ranked high in relevance to the topic of the text may be extracted and identified as keyphrases 22.

Figure 5:
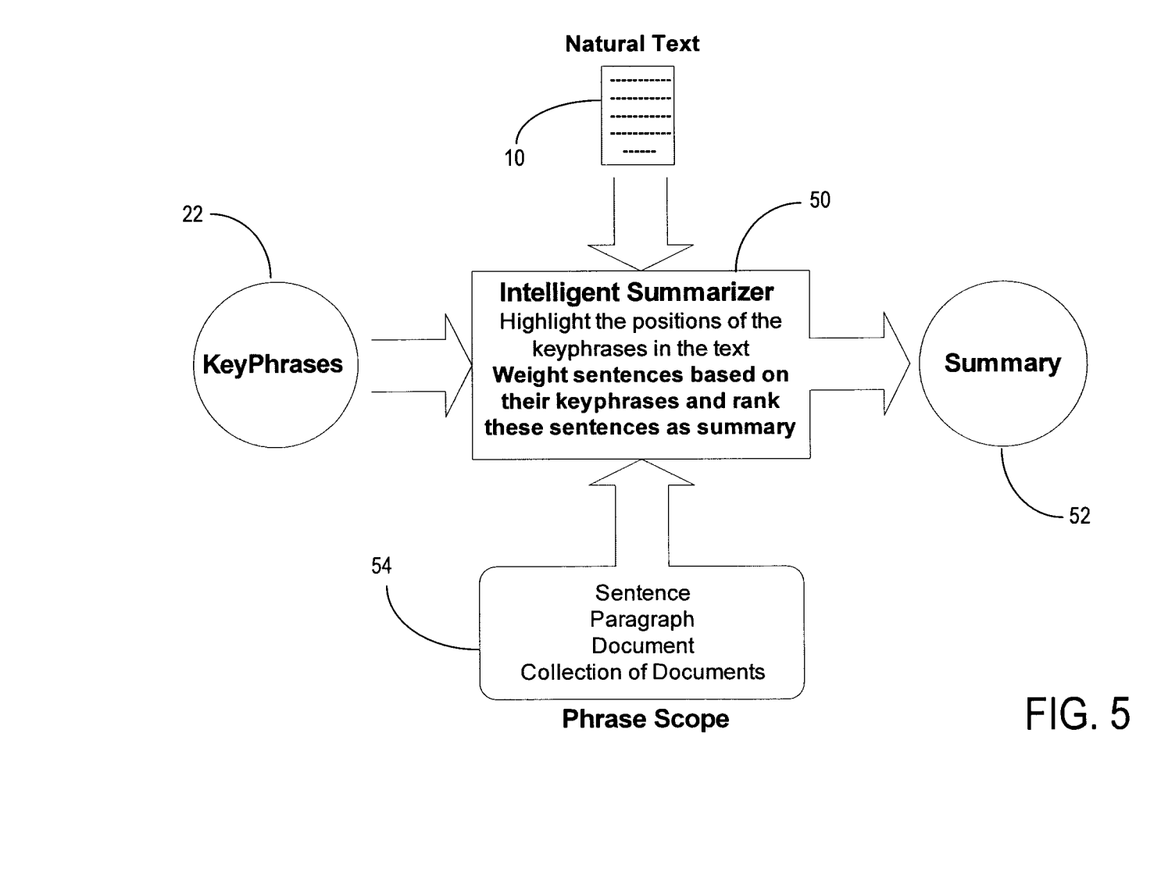
FIG. 5 is a systems diagram showing the intelligent summarizer.

As shown in FIG. 5, the present invention may apply an intelligent summarizer 50 to highlight the positions of keyphrases 22 in the text 10 and produce a summary 52 of the text based upon the positions of the keyphrases. The text may be summarized by extracting the most important text segments with a text, these text segments may be various forms of phrase scope 54, such as, for example, a sentence, paragraph, document or collection of documents. The position of keyphrases as previously determined to be associated with the text. Text segments containing keyphrases with relatively high score, as determined in accordance with the method described above, are extracted as text summary. Text segments are weighted based on the existence of keyphrases within those text segments. Text segments are determined in the context of specific phrase scope.

Figure 6:
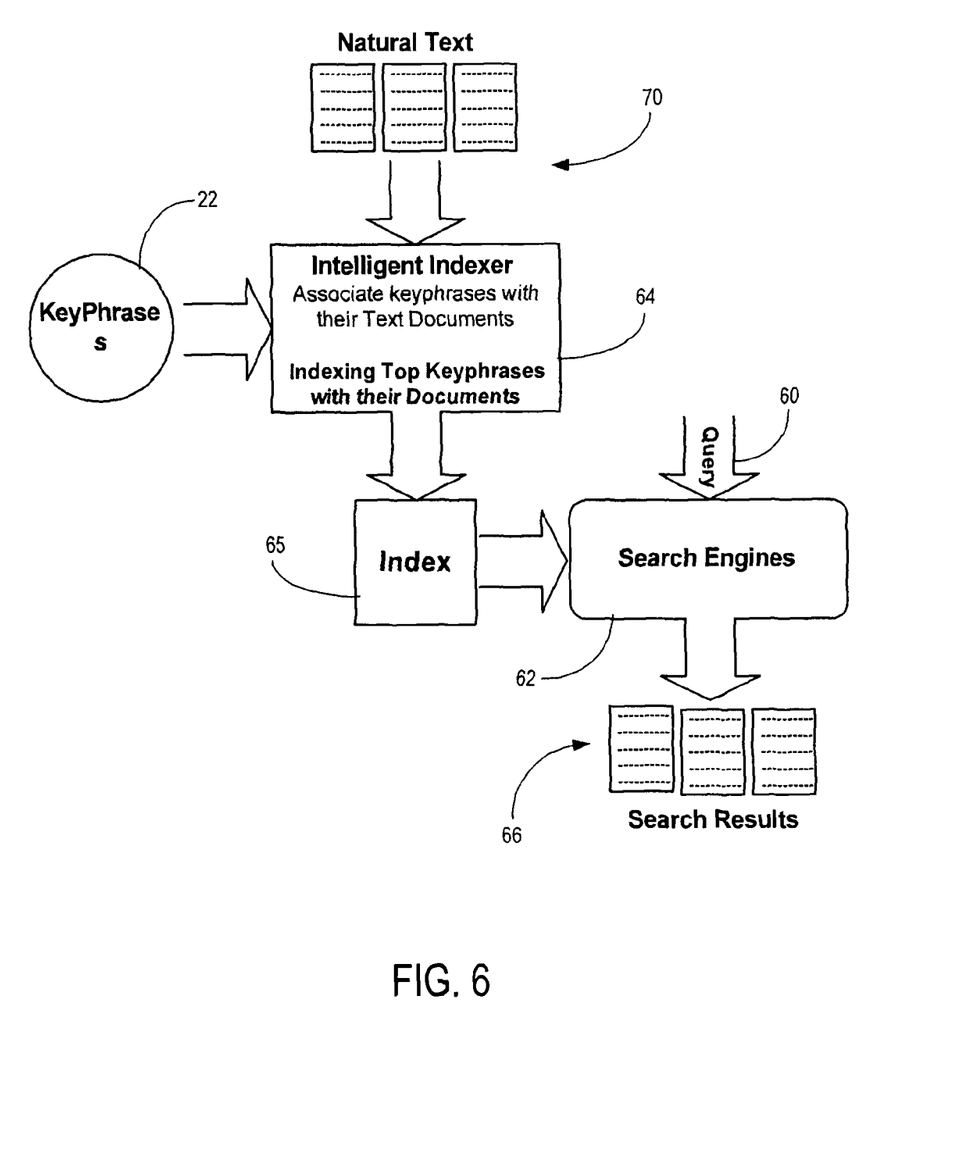
FIG. 6 is a systems diagram showing the sentence-based intelligent indexer.

As shown in FIG. 6, the present invention may incorporate an intelligent indexer 64. The intelligent indexer may extract keyphrases 22 related to one or more texts 70. The keyphrases may be utilized to build a phrase-based index 65. The intelligent indexer 64 may associate one or more keyphrases with the text to which each keyphrase identified as relevant. The intelligent indexer 64 may facilitate indexing of one or more top keyphrases with one or more texts.

One or more search engines 62 or other text retrieval means, such as, for example Lucene, may be utilized to provide higher scores to query words that appear in the phrase-based index. A user or other means may produce a query 60 and provide this to a search engine. The query may be a search term, which can be a search string. A search of the index 65 of the intelligent indexer 64 may be conducted to search for matches or near-matches between keyphrases and the query and produce search results 66. Matches or near-matches may be utilized to identify texts related to the keyphrases. Such texts may be made accessible to the instigator of the query.

The present invention may also be implemented in any of the following applications:
1. Topic Detection. By identifying the most important keyphrases in text segments, these key phrases could be generalized and mapped to general concepts to identify the topic of the text segments. For example: we can identify if a piece of text is about economics, sports, educations, etc.

2. Mobile Market. As the mobile phones have limited resources, many techniques are based on modifying Internet web pages to "fit" within the screen size and other attributes of mobile phones. This can be done by reducing images and extracting important text from less important text. The present invention may be used to summarize documents for this purpose.

3. Emails. As people used to receive many emails on their smart phones. This invention can be used to save the users time and cost by summarizing emails by providing the most important sentences in each email or for multiple emails (if they are related). If the user is interested in the email, he/she can read entire email.

4. Documents and Document Management. In an organization, if there are thousands of documents that are related to each other and the user doesn't have time to read all these documents. This invention can be used to extract the most important keyphrases and use these phrases to group documents that are semantically related to each other. This will facilitate for the user to look at the group of interest instead of looking into all these documents. In addition, based on the keyphrases, the system can generate a hierarchical classification based on the content of the documents. This hierarchical classification can be used to provide hierarchical information for the organization.

The present invention has obvious advantages if embodied in a search engine. For example, by operation of a search engine based on the technology described, each document may be analyzed and keyphrases that represent the document's meaning are extracted.

The present invention also enables a novel method for indexing such document, i.e. document indexing with novel features. Such indices generally include fields that describe the index, in accordance with known methods. In a specific implementation of the invention, such fields would be populated with keyphrases generated in accordance with the present invention, such that a search would be based not on the document's content only but rather on or also on indexed keyphrases for the document, established in accordance with the present invention. If a query appeared in the indexed keyphrases the scoring function would give higher rank to the document, thus providing better relevant to search results.

For example, the present invention may take the advantage of using Apache License Search Engines that have index features such as Lucene. Apache Lucene is a high-performance, full-featured text search engine library written entirely in Java. It is a technology suitable for nearly any application that requires full-text search, especially cross-platform. To take the present invention to production level, this invention uses enterprise search server called Solr. Solr is an open source enterprise search server based on the Lucene Java search library, with XML/HTTP and JSON APIs, hit highlighting, faceted search, caching, replication, a web administration interface and many more features. It runs in a Java servlet container such as Tomcat.

Thus, in an aspect of the invention, there is provided a computer implemented method for extracting keyphrases from natural text, characterized in that it comprises: (a) generating one or more phrases in the natural text based on an identification of one or more phrase separators in the natural text; (b) assigning a weight to each phrase based on its frequency in the natural text; and (c) ranking the phrases based on their weights to extract one or more keyphrases having the highest ranks.

In an embodiment, the method further comprises generating the one or more phrase separators utilizing an intelligent classifier.

In another embodiment, the method further comprises training the intelligent classifier using one or more training texts, whereby the intelligent classifier is adapted to learn to recognize phrase separators.

In another embodiment, the method further comprises teaching the intelligent identifier to identify phrase separators in training texts based on one or more of word position, part of speech tagging, word type, and features or parts of text.

In another embodiment, the method further comprises utilizing a part of speech tagging model including a knowledge-based dictionary to identify phrase separators based on part of speech tags allotted within the natural text.

In another embodiment, the method further comprises utilizing the knowledge-based dictionary to build a hash table for each word in the natural text.

In another embodiment, the method further comprises evaluating each word in accordance with a lookup table as to whether the word has one or more part of speech tags.

In another embodiment, the method further comprises applying one or more phrase separators to split the natural text based on heuristic rules; and generating one or more phrases.

In another embodiment, the method further comprises calculating the frequency of each phrase as it occurs within the one or more generated phrases.

In another embodiment, the method further comprises calculating the frequencies of phrases based on words that appear in each phrase.

In another embodiment, the frequency of a phrase p with a scope is calculated by $$weight_{p_{scope}} = freq(p, scope), \text{ where } scope = \{sent, parag, doc, collec\}.$$

In another embodiment, the average frequency of phrase p that appears in the natural text is calculated by $$weight_p = \frac{\sum_{i=1}^{s} weight_{p_{sent}}}{s}$$

where s is the total number of sentences that contain phrase p in document d.

In another embodiment, the method further comprises weighting the phrases based on context of the phrase to the natural text, whereby a probability value is assigned to each phrase based on the frequency of the phrase in the text, and the assigned probability value is used to generate a score for each phrase.

In another embodiment, the method further comprises ranking the weighted phrases in accordance with their weights to extract keyphrases from the phrases.

In another embodiment, the method further comprises applying an intelligent summarizer to highlight the positions of keyphrases in the natural text and produce a summary of the natural text based on the positions of the keyphrases.

In another embodiment, the method further comprises extracting text segments containing keyphrases with a high score as a text summary of the natural text.

In another embodiment, the method further comprises incorporating an intelligent indexer to extract keyphrases related to one or more natural texts to build a phrase-based index.

In another embodiment, the method further comprises utilizing one or more text retrieval means to provide higher scores to query words that appear in the phrase-based index.

In another embodiment, the text retrieval means is a search engine and the query is a search term or search string.

In another embodiment, the method further comprises conducting a search of the phrase-based index for matches or near-matches between keyphrases and the query.

In another aspect, there is provided a method for extracting keyphrases from natural text, including steps of (a) generating one or more phrases in the natural text based on an identification of one or more phrase separators in the natural text; (b) additionally identifying semantic frames that are associated with the one or more phrase separators and analyzing the semantic frames so as to associate with one another phrases that have a related meaning; (c) assigning a weight to each phrase based on its frequency in the natural text and also based on the associations between each phrase and other phrases based on related meaning; and (d) ranking the phrases based on their weights to extract one or more keyphrases having the highest ranks. This enables the identification of associated portions of the natural text and further enhances the ability (using the technology described herein) to capture from the natural text the most important keyphrases. The ranking of the keyphrases based on frequency and additionally based on semantic relationship could be accomplished for example as follows.

Example: Assume that we have two sentences:
1. John looked at the dog.
2. Mary saw her cat.

For the first sentence, the phrase separator is "looked" and the phrases are "John" and "dog". For the second sentence the phrase separator will be "see" and the phrases are "Mary" and "cat".

The system of the present invention may utilize the following information for identifying text with meaning related to other text:
1. Semantic relations between the words;
2. Semantic frames of the word separators;
3. Conceptual meaning of the words; and
4. the Named entity.

Semantic Relation
$1^{st}$ Sentence: "John" is the subject, "Looked" is the verb, and "dog" is the object.
$2^{nd}$ Sentence: "Mary" is the subject, "Saw" is the verb, and "cat" is the object.

Semantic Frames
$1^{st}$ Sentence: the verb "Look" belongs to the "Seeking" frame as an Agent is seeking for something and "John" is the Cognizer agent for the seeking frame.
$2^{nd}$ Sentence: the verb "See" belongs also to the same "Seeking" frame as an Agent is seeking for something and "Mary" is the Cognizer agent for the seeking frame.

Conceptual Meaning
$1^{st}$ Sentence: the concept of the word "look" is "perceive". The concept of word "dog" is "mammal".
$2^{nd}$ Sentence: the concept of the word "see" is also "perceive". The concept of word "cat" is mammal.

Named Entity
$1^{st}$ Sentence: "John" is a person. Also, "animal" can be the named entity for "dog".
$2^{nd}$ Sentence: "Mary" is a "person". "Cat" is named to "animal".

In one aspect of the invention, above dimensions provide a novel technique for establishing semantic distance, and can be implemented to a semantic engine and a computer program for enabling semantic analysis.

In one aspect of the invention, the information referred to above for identifying text with related meaning is tracked, and the phrase separators and their words are grouped so as to establish groups of phrases of similar meaning. The weighting is then applied to such groups of phrases of similar meaning, so as to establish the ranking of the phrases, and thereby enable the extraction of keyphrases from the text. Therefore in this aspect, the keyphrases are extracted based on the frequency of phrases and also phrases of related meaning. It should be understood that, in establishing the groups of phrases having similar meaning different indicators of similarity of meaning may be used than those identified above, and also regarding the specific indicators identified above, depending on attributes of the text, different weight may be given based on application of one or more of the dimensions referenced above, i.e. semantic relations, semantic frames, conceptual meaning, and named entity.

It should be understood that the extraction of the keyphrases in part based on semantic relations between the phrases can be implemented by addressing the semantic distance between the phrases. For example, the groups of phrases and phrases of similar meaning may be established using conditions based on semantic distance, for example by applying known clustering techniques. The weight of each group may represent the contribution of the phrases of this group to the meaning of the text. In addition, the principles of semantic distance of the present invention can also be applied in weighting the phrases or groups of phrases. For example, phrases that are not part of groups but are semantically related to phrases in one or more of the groups may be assigned a greater weight. It should be understood that in determining semantic distance one or more of the dimensions referred to above may be addressed, i.e. semantic relations, semantic frames, conceptual meaning, or named entity.

In another aspect, there is provided a system having a processor and memory adapted to perform any one of above methods.

In another aspect, there is provided a computer readable media storing computer code that when loaded into a computer device adapts the device to perform any one of the above methods.

It will be appreciated by those skilled in the art that other variations of the embodiments described herein may also be practiced without departing from the scope of the invention. Other modifications are therefore possible. For example, the present invention may be utilized to identify keywords in textual data generally, or in relation to specific text, such as website advertisements. The present invention may be applicable to a variety of innovation sectors, such as categorization, clustering, topic identification, and named entity recognition.

The invention claimed is:

1. A computer implemented method for extracting keyphrases from natural text, characterized in that it comprises:
   (a) generating one or more phrases in the natural text based on one or more phrase separators in the natural text, wherein each of the one or more phrase separators comprises one or more words from the natural text;
   (b) assigning a weight to each of the one or more phrases in the natural text based on its frequency in the semantic frames of one or more sentences of the natural text, wherein each of the one or more sentences is divided into one or more sub-texts by the one or more phrase separators, and the assigned weight is calculated for each of the one or more phrases based on a frequency of the respective phrase within the one or more sub-texts of each sentence; and (c) ranking the one or more phrases based on their weights to extract one or more keyphrases having the highest ranks.

2. The method of claim 1, further comprising generating the one or more phrase separators utilizing an intelligent classifier, wherein the intelligent classifier generates the one or more phrase separators from the natural text by identifying portions of the natural text as either phrase separators or not phrase separators.

3. The method of claim 2, characterized in that it further comprises training the intelligent classifier using one or more training texts, whereby the intelligent classifier is adapted to learn to recognize phrase separators.

4. The method of claim 3, characterized in that it further comprises teaching the intelligent identifier to identify phrase separators in training texts based on one or more of word position, part of speech tagging, word type, and features or parts of text.

5. The method of claim 4, characterized in that it further comprises utilizing a part of speech tagging model including a knowledge-based dictionary to identify phrase separators based on part of speech tags allotted within the natural text.

6. The method of claim 5, characterized in that it further comprises utilizing the knowledge-based dictionary to build a hash table for each word in the natural text.

7. The method of claim 6, characterized in that it further comprises evaluating each word in accordance with a lookup table as to whether the word has one or more part of speech tags.

8. The method of claim 1, characterized in that it further comprises:
applying the one or more phrase separators to split the natural text based on heuristic rules; and
generating the one or more phrases.

9. The method of claim 8, characterized in that it further comprises calculating the frequency of each of the one or more phrases as it occurs within the one or more generated phrases.

10. The method of claim 9, characterized in that it further comprises calculating the frequency of each of the one or more phrases based on words that appear in each phrase.

11. The method of claim 9, characterized in that the frequency of a phrase p with a scope is calculated by $o$ weight=freq($p$,scope), where scope={sent,parag, doc,collec}.

12. The method of claim 10, characterized in that the average frequency of phrase p that appears in the natural text is calculated by $$\text{weight}_p = \frac{\sum_{i=1}^{s} \text{weight}_{p_{sent}}}{s}$$

where s is the total number of sentences that contain phrase p in documents.

13. The method of claim 1, characterized in that it further comprises weighting the phrases based on context of the phrase to the natural text, whereby a probability value is assigned to each phrase based on the frequency of the phrase in the text, and the assigned probability value is used to generate a score for each phrase.

14. The method of claim 13, characterized in that it further comprises ranking the weighted phrases in accordance with their weights to extract keyphrases from the phrases.

15. The method of claim 1, characterized in that it further comprises applying an intelligent summarizer to highlight the positions of keyphrases in the natural text and produce a summary of the natural text based on the positions of the keyphrases.

16. The method of claim 15, characterized in that it further comprises extracting text segments containing keyphrases with a high score as a text summary of the natural text.

17. The method of claim 1, characterized in that it further comprises incorporating an intelligent indexer to extract keyphrases related to one or more natural texts to build a phrase-based index.

18. The method of claim 17, characterized in that it further comprises utilizing one or more text retrieval means to provide higher scores to query words that appear in the phrase-based index.

19. The method of claim 18, characterized in that the text retrieval means is a search engine and the query is a search term or search string.

20. The method of claim 19, characterized in that it further comprises conducting a search of the phrase-based index for matches or near-matches between keyphrases and the query.

21. A computer implemented method for extracting keyphrases from natural text, characterized in that it comprises:

(a) generating one or more phrases in the natural text based on one or more phrase separators in the natural text, wherein each of the one or more phrase separators comprises one or more words from the natural text;

(b) identifying semantic frames that are associated with the one or more phrase separators and analyzing the semantic frames so as to associate with one another phrases that have a related meaning;

(c) assigning a weight to each of the one or more phrases in the natural text based on its frequency in the semantic frames of one or more sentences of the natural text and also based on the associations between each phrase and other phrases based on related meaning, wherein each of the one or more sentences is divided into one or more sub-texts by the one or more phrase separators, and the assigned weight is calculated for each of the one or more phrases based on a frequency of the respective phrase within the one or more sub-texts of each sentence; and (d) ranking the one or more phrases based on their weights to extract one or more keyphrases having the highest ranks.

22. A system having a processor and memory adapted to perform a method comprising the steps of:

generating one or more phrases in the natural text based on an identification of one or more phrase separators in the natural text, wherein each of the one or more phrase separators comprises one or more words from the natural text;

identifying semantic frames that are associated with the one or more phrase separators and analyzing the semantic frames so as to associate with one another phrases that have a related meaning;

assigning a weight to each of the one or more phrases in the natural text based on its frequency in the semantic frames of one or more sentences of the natural text and also based on the associations between each phrase and other phrases based on related meaning, wherein each of the one or more sentences is divided into one or more sub-texts by the one or more phrase separators, and the assigned weight is calculated for each of the one or more phrases based on a frequency of the respective phrase within the one or more sub-texts of each sentence; and ranking the one or more phrases based on their weights to extract one or more keyphrases having the highest ranks.

23. A non-transitory computer readable storage medium storing a set of computer program instructions, which when executed by a processor, causes a computer device to perform a method comprising the steps of:

generating one or more phrases in the natural text based on one or more phrase separators in the natural text, wherein each of the one or more phrase separators comprises one or more words from the natural text;

identifying semantic frames that are associated with the one or more phrase separators and analyzing the semantic frames so as to associate with one another phrases that have a related meaning;

assigning a weight to each of the one or more phrases in the natural text based on its frequency in the semantic frames of one or more sentences of the natural text and also based on the associations between each phrase and other phrases based on related meaning, wherein each of the one or more sentences is divided into one or more sub-texts by the one or more phrase separators, and the assigned weight is calculated for each of the one or more phrases based on a frequency of the respective phrase within the one or more sub-texts of each sentence; and ranking the one or more phrases based on their weights to extract one or more keyphrases having the highest ranks.

* * * * *